US012148295B2

(12) United States Patent
Lu et al.

(10) Patent No.: US 12,148,295 B2
(45) Date of Patent: Nov. 19, 2024

(54) METHOD OF PREDICTING TRAFFIC VOLUME, ELECTRONIC DEVICE, AND MEDIUM

(71) Applicant: BEIJING BAIDU NETCOM SCIENCE TECHNOLOGY CO., LTD., Beijing (CN)

(72) Inventors: Xinjiang Lu, Beijing (CN); Dejing Dou, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 338 days.

(21) Appl. No.: 17/824,966

(22) Filed: May 26, 2022

(65) Prior Publication Data

US 2022/0284807 A1 Sep. 8, 2022

(30) Foreign Application Priority Data

May 27, 2021 (CN) ........................ 202110587941.X

(51) Int. Cl.
*G08G 1/01* (2006.01)

(52) U.S. Cl.
CPC .................................. *G08G 1/0125* (2013.01)

(58) Field of Classification Search
None
See application file for complete search history.

(56) References Cited

U.S. PATENT DOCUMENTS

2021/0020038 A1* 1/2021 Weldemariam ...... G08G 1/0112
2022/0058944 A1* 2/2022 Jha ...................... G08G 1/0141

* cited by examiner

*Primary Examiner* — Brian P Sweeney
*Assistant Examiner* — Jonathan E Reinert
(74) *Attorney, Agent, or Firm* — Pillsbury Winthrop Shaw Pittman, LLP

(57) ABSTRACT

A method of predicting traffic volume, an electronic device, and a storage medium are provided, which relate to a field of artificial intelligence technology, in particular to big data and deep learning technologies The method includes: generating, for a plurality of traffic regions, a function relation graph and a volume relation graph; generating a volume feature of a target traffic region among the plurality of traffic regions, according to a historical volume information of the target traffic region; generating a volume and function relation feature for the target traffic region, based on the function relation graph and the volume relation graph; and predicting a volume of the target traffic region according to the volume feature and the volume and function relation feature.

19 Claims, 9 Drawing Sheets

| | 19/3-19/6 | 19/4-19/7 | 19/5-19/8 | 19/6-19/9 | 19/7-19/10 (Year/Month) |
|---|---|---|---|---|---|
| Food function | 0.0 | 1.0 | 0.0 | 1.0 | 0.408248 |
| Service function | 0.345592 | 0.345592 | 0.408248 | 0.816497 | 0.408248 |

METHOD OF PREDICTING TRAFFIC VOLUME, ELECTRONIC DEVICE, AND MEDIUM

This application claims priority to Chinese Patent Application No. 202110587941.X, filed on May 27, 2021, the entire contents of which is incorporated herein in its entirety by reference.

TECHNICAL FIELD

The present disclosure relates to a field of artificial intelligence technology, in particular to big data and deep learning technologies. More specifically, the present disclosure provides a method of predicting traffic volume, an electronic device and a storage medium.

BACKGROUND

Urban traffic volume is significant to an operation capacity of highway network, people's travel efficiency and a prediction of traffic accidents.

Traffic volume has temporal variability and complexity. In a current method of predicting traffic volume, a volume at a historical moment is only used to predict a volume at a future time instant, so that a prediction accuracy is low.

SUMMARY

A method of predicting traffic volume, an electronic device and a storage medium are provided in the present disclosure.

According to an aspect, a method of predicting traffic volume is provided, including: generating, for a plurality of traffic regions, a function relation graph and a volume relation graph; generating a volume feature of a target traffic region among the plurality of traffic regions, according to a historical volume information of the target traffic region; generating a volume and function relation feature for the target traffic region, based on the function relation graph and the volume relation graph; and predicting a volume of the target traffic region according to the volume feature and the volume and function relation feature.

According to an aspect, an electronic device is provided, including: at least one processor; and a memory communicatively connected to the at least one processor, the memory stores instructions executable by the at least one processor, and the instructions, when executed by the at least one processor, cause the at least one processor to implement the method provided in the present disclosure.

According to an aspect, a non-transitory computer-readable storage medium having computer instructions stored thereon is provided, wherein the computer instructions are configured to cause a computer to implement the method provided in the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to better understand the scheme and do not constitute a limitation of the present disclosure, in which.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

Figure 1:
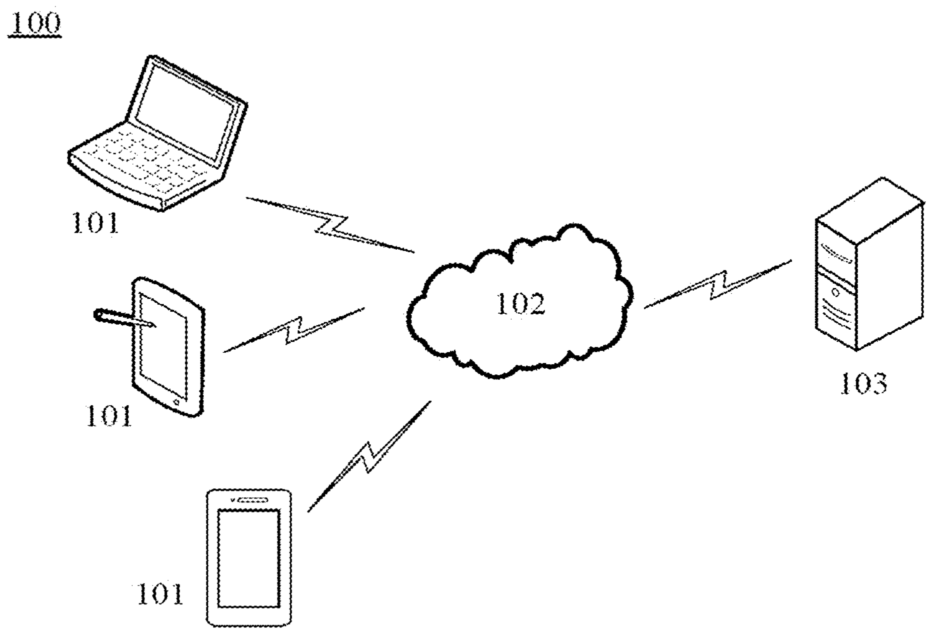
FIG. 1 shows a schematic diagram of an exemplary system architecture that may apply a method of predicting traffic volume according to an embodiment of the present disclosure.

FIG. 1 shows a schematic diagram of an exemplary system architecture that may apply a method of predicting traffic volume according to an embodiment of the present disclosure. It should be noted that FIG. 1 only shows an example of the system architecture to which embodiments of the present disclosure may be applied, so as to help those skilled in the art understand the technical content of the present disclosure, but it does not mean that embodiments of the present disclosure may not be used in other devices, systems, environments or scenes.

As shown in FIG. 1, the system architecture 100 according to an embodiment may include a plurality of terminal devices 101, a network 102, and a server 103. The network 102 is a medium for providing a communication link between the terminal devices 101 and the server 103. The network 102 may include various connection types, such as wired and/or wireless communication links, etc.

The terminal devices 101 may be used by a user to interact with the server 103 via the network 102, so as to receive or transmit messages, etc. The terminal devices 101 may be various electronic devices including, but not limited to, a smart phone, a tablet computer, a laptop computer, and the like.

The method of predicting traffic volume provided by embodiments of the present disclosure may generally be performed by the server 103. Accordingly, at least one apparatus of predicting traffic volume provided by embodiments of the present disclosure may generally be provided in the server 103. The method of predicting traffic volume provided by embodiments of the present disclosure may also be performed by a server or server cluster which is different from the server 103 and capable of communicating with the terminal devices 101 and/or the server 103. Accordingly, the apparatus of predicting traffic volume provided by embodiments of the present disclosure may also be provided in a server or server cluster which is different from the server 103 and capable of communicating with the terminal devices 101 and/or the server 103.

Figure 2:
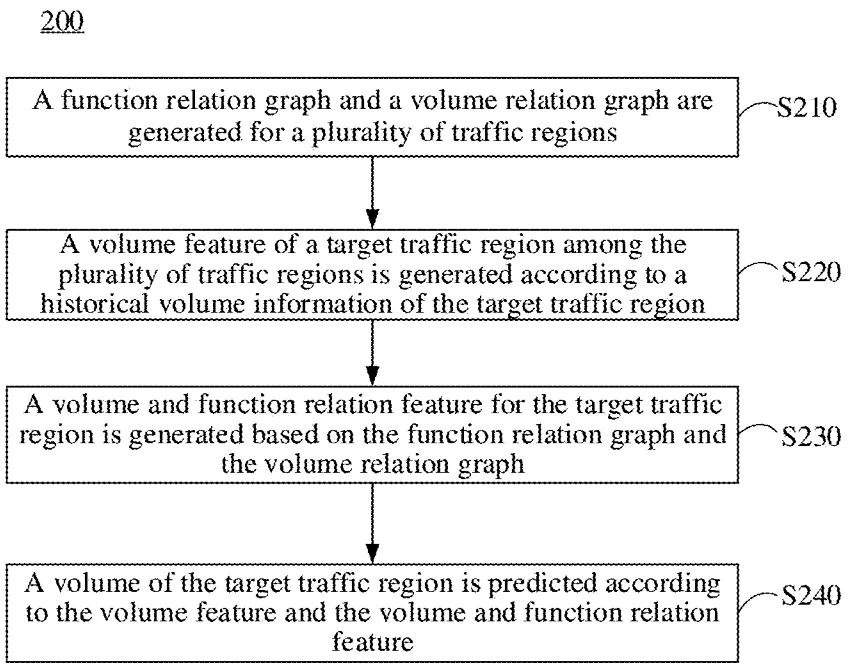
FIG. 2 shows a flowchart of a method of predicting traffic volume according to an embodiment of the present disclosure.

FIG. 2 shows a flowchart of a method of predicting traffic volume according to an embodiment of the present disclosure.

As shown in FIG. 2, the method 200 of predicting traffic volume includes operations S210 to S240.

In operation S210, a function relation graph and a volume relation graph are generated for a plurality of traffic regions.

For example, the traffic region is determined based on a road network information. A city may be divided into a plurality of blocks according to the road network information, and each traffic region may correspond to a block. A function correlation and a volume correlation exist among the plurality of traffic regions.

For example, a function of the traffic region may be reflected in a function attribute (such as education, shopping and medical treatment) of a POI (Point-of-Interest, such as school, shopping mall and hospital) located in the traffic region. A volume of the traffic region is reflected in a traffic volume generated in the traffic region. The traffic volume includes an amount of volume generation (i.e. a traffic volume starting from the traffic region) and an amount of volume attraction (i.e. a traffic volume ending at the traffic region).

For example, the function correlation between the traffic regions may be measured based on a similarity between the functions of the traffic regions, and traffic regions with the function similarity greater than a first preset threshold (for example, 0.6) may be connected to generate the function relation graph. A volume similarity between the traffic regions is measured based on a similarity between the traffic volumes of the traffic regions, and traffic regions with the volume similarity greater than a second preset threshold (for example, 0.8) are connected to generate the volume relation graph.

In operation S220, a volume feature of a target traffic region among the plurality of traffic regions is generated according to a historical volume information of the target traffic region.

For example, the historical volume information of the target traffic region (target block) may contain a traffic volume within a historical time period (such as a historical week). The historical volume information may be serialized to obtain a volume information sequence. Feature extraction and vector representation may be performed on the volume information sequence for the target block by using a neural network model, so as to generate a volume feature vector (referred to as volume feature) for the target block.

For example, the volume information sequence for the target block may be modeled by using a serialization model (such as gated recurrent unit, GRU) to obtain a volume state representation of the target block at a current time instant. For another example, the volume information sequence for the target block may be processed as a vector, and the volume information sequence for the target block may be characterized by using, for example, a self-attention mechanism network model to obtain the volume feature of the target block.

In operation S230, a volume and function relation feature for the target traffic region is generated based on the function relation graph and the volume relation graph.

The function relation graph reflects the function correlation between the traffic regions, and the volume relation graph reflects the volume correlation between the traffic regions. For the same target block located in both the function relation graph and the volume relation graph, the volume and function relation feature for the target block may be generated by combining the function relation graph and the volume relation graph.

For example, a function similar neighbor block set associated with the target block is acquired from the function relation graph, and a volume similar neighbor block set associated with the target block is acquired from the volume relation graph. For the two neighbor block sets, a historical function information and a historical volume information of each block in the two neighbor block sets may be acquired. The historical function information reflects a function transition of the traffic region, and the historical volume information reflects a traffic volume change of the traffic region. A historical function information and a historical volume information that interact with each other may be determined based on a temporal correlation (such as a temporal order) between the historical function information and the historical volume information. A neural network model (for example, attention model) may be used for feature extraction and vector representation of the historical function information and the historical volume information that interact with each other, so that the volume and function relation feature for the target traffic region may be obtained.

It may be understood that the historical function information and the historical volume information that interact with each other include a historical volume information affecting the function transition and a historical function information affecting the traffic volume change. For example, in a certain time period (for example, in February of a certain year), as a traffic volume of a certain location in the traffic region decreases, a restaurant at this location becomes a park, that is, a food function changes into a leisure function, which indicates that the traffic volume change of the traffic region affects the function transition of the traffic region in this time period (in February of the certain year). For another example, in a certain time period (for example, in the third quarter of a certain year), a school at a certain location in the traffic region becomes a shopping mall, that is, an education function changes into a shopping function, resulting in an increase of a traffic volume of the location, which indicates that the function transition of the traffic region in this time period (for example, the third quarter of the certain year) affects the traffic volume of the traffic region.

In operation S240, a volume of the target traffic region is predicted according to the volume feature and the volume and function relation feature.

For example, the volume feature and the volume and function relation feature may be aggregated, and an aggregation method may include a pooling operation, weighted summation, etc. A neural network model (such as multilayer perceptron, MLP) is used to calculate a feature vector after the aggregation to obtain the predicted volume of the target traffic region at a future time instant.

According to embodiments of the present disclosure, the volume and function relation feature reflects the interaction between the function transition and the traffic volume change of the traffic region. Different from predicting the volume only according to the historical volume information, it is possible to improve the accuracy of predicting the volume by predicting the volume of the target traffic region based on the volume feature of the target traffic region and the volume and function relation feature for the target traffic region.

The function relation graph may be constructed according to the function correlation between the plurality of traffic regions, the volume relation graph may be constructed according to the volume correlation between the plurality of traffic regions, and a traffic relation graph may also be constructed according to a traffic volume between the plurality of traffic regions.

Figure 3A:
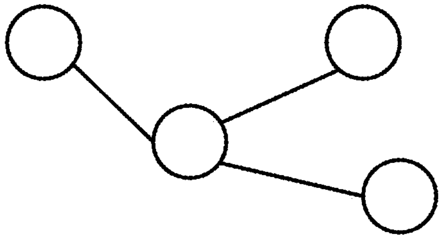
FIGS. 3(*a*) to 3(*c*) show schematic diagrams of a function relation graph, a volume relation graph, and a traffic relation graph, respectively, according to an embodiment of the present disclosure.
Figure 3B:
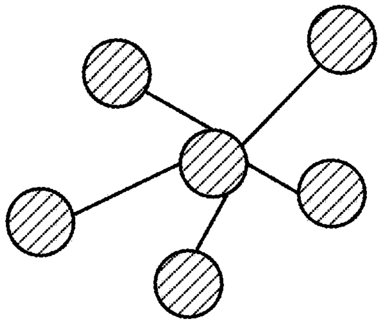
Figure 3C:
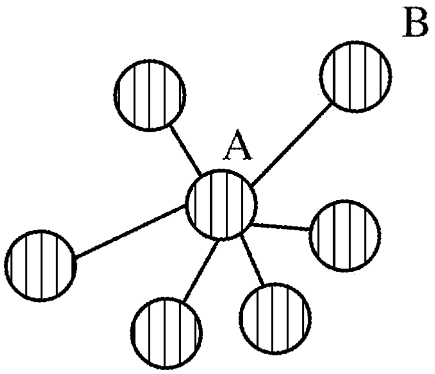

FIGS. 3(*a*) to 3(*c*) show schematic diagrams of a function relation graph, a volume relation graph, and a traffic relation graph, respectively, according to an embodiment of the present disclosure.

FIG. 3(*a*) shows a function relation graph, FIG. 3(*b*) shows a volume relation graph, and FIG. 3(*c*) shows a traffic relation graph. A process of constructing each graph is described in detail below.

For the function relation graph of FIG. 3(*a*), each block in the city includes a plurality of POIs (such as a school, a shopping mall, a hospital, etc.), and each POI has a location information and a category information. Different categories of POIs reflect the function attributes of the block (such as education, shopping, medical treatment, etc.), and different categories of function attributes may form a function distribution vector for the traffic region. For example, if a block contains three categories of POIs, namely six shopping malls, one hospital and one school, a length of a function distribution vector for the block is 3, and each element of the function distribution vector corresponds to one of the three categories. Each element may be a proportion of a function attribute of a different category.

A cosine similarity between the function distribution vectors for each two blocks may be calculated as a function similarity between the two blocks, and two blocks whose function similarity is greater than a first preset threshold (for example, 0.6) may be connected through one edge to form the function relation graph of FIG. 3(*a*). As shown in FIG. 3(*a*), each node in the function relation graph represents a block. The block in the center may be used as the target block. Each edge connects two nodes. A function similarity between two nodes connected through an edge is greater than the first preset threshold (for example, 0.6), and a weight of the edge may be the function similarity between the two blocks connected to the edge.

For the volume relation graph of FIG. 3(*b*), a traffic volume (including an amount of generation and an amount of attraction) of each block within a preset historical time period (for example, within a historical week) is obtained, and the historical volume information is serialized to obtain a volume information sequence for the block. A volume information sequence having a length of 24 hours for each block may be taken as a basic volume segment. A similarity between the basic volume segments of each two blocks may be calculated as the volume similarity between the two blocks, and two blocks whose volume similarity is greater than a second preset threshold (for example, 0.8) may be connected through one edge to form the traffic relation graph of FIG. 3(*b*). As shown in FIG. 3(*b*), each node in the volume relation graph represents a block. The block in the center may be used as the target block. Each edge connects two nodes. A volume similarity between two nodes connected through an edge is greater than the second preset threshold (for example, 0.8), and a weight of the edge may be the volume similarity between the two blocks connected to the edge.

For the traffic relation graph of FIG. 3(*c*), the traffic relation graph may be obtained by connecting two blocks, among the plurality of blocks, having a traffic volume between each other. For example, if a traffic volume exists from block A to block B, a directed edge from block A to block B exists, and a weight of the edge is the traffic volume from block A to block B. As shown in FIG. 3(*c*), each node in the traffic relation graph represents a block. The block in the center may be used as the target block. The edges in the traffic relation graph include a directed edge from block A to block B and a directed edge from block B to block A.

According to embodiments of the present disclosure, it is helpful to analyze relationships between the plurality of traffic regions in terms of function and traffic volume, according to the function relation graph, the volume relation graph and the traffic relation graph for the plurality of traffic regions.

The target block in the function relation graph, the target block in the volume relation graph and the target block in the traffic relation graph may be the same block. A geographic feature of the target block may be calculated by using a neural network model (such as attention network (node attention)) based on the above-mentioned three graphs.

Figure 4:
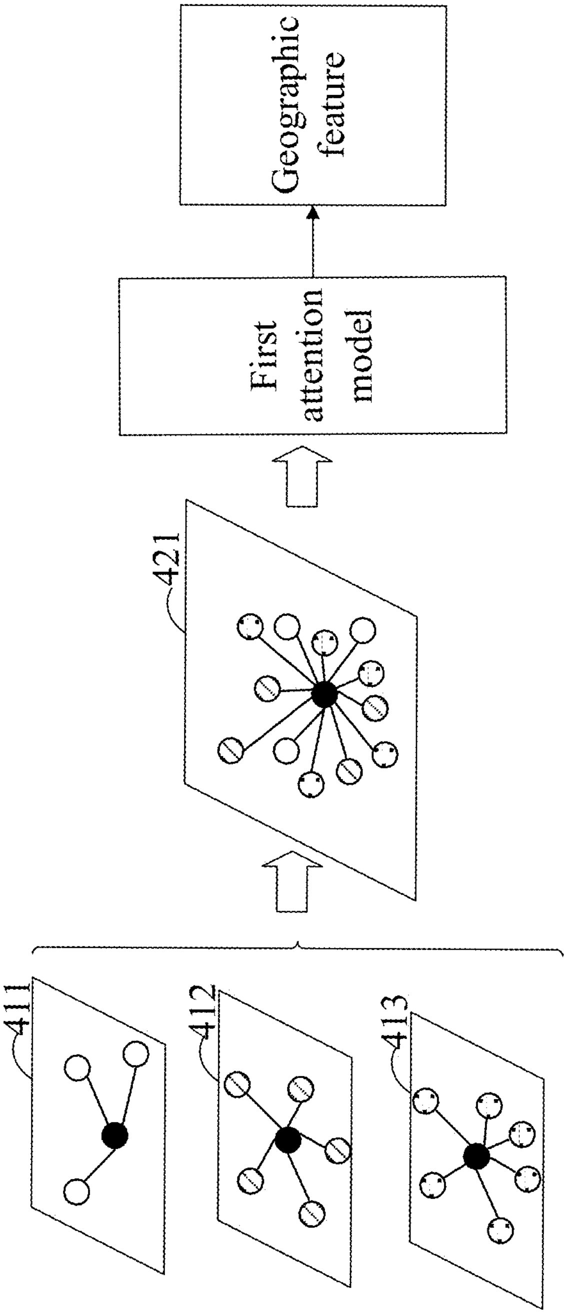
FIG. 4 shows a schematic diagram of generating a geographic feature of a target traffic region according to an embodiment of the present disclosure.

FIG. 4 shows a schematic diagram of generating a geographic feature of a target traffic region according to an embodiment of the present disclosure.

As shown in FIG. 4, a neighbor relation graph 421 may be constructed based on a function relation graph 411, a volume relation graph 412 and a traffic relation graph 413. The neighbor relation graph 421 is centered on the target block and includes nodes from the function relation graph 411, the volume relation graph 412 and the traffic relation graph 413. For example, various neighbor blocks adjacent to the target block are acquired from the function relation graph 411, the volume relation graph 412 and the traffic relation graph 413. A threshold of the number of neighbor blocks acquired from each of the different graphs may be set, according to a scale of each relation graph and a scale of the neighbor relation graph to be constructed. For example, the number of neighbor blocks acquired from the function relation graph 411 is less than 10, the number of neighbor blocks acquired from the volume relation graph 412 is less than 23, and the number of neighbor blocks acquired from the traffic relation graph 413 is less than 15, etc. Feature vectors for the target block and the neighbor blocks acquired from different relation graphs are mapped according to a following formula (1), so as to map the target block and the neighbor blocks to the neighbor relation graph 421:

$$h'_i = M_{\phi_i} \cdot h_i \tag{1}$$

wherein, $h_i$ is a feature vector for an $l^{th}$ node (i.e. block) in a relation graph, $\phi_i$ is a type of an edge (one of an edge carrying function similarity, an edge carrying volume similarity, or an edge carrying traffic volume) between the node i and the target node, $M_{\phi_i}$ indicates a linear mapping method based on the $\phi_i$ type edge, $h'_i$ is a feature vector for the node i after the mapping, that is, a feature vector for the node i in the neighbor relation graph 421.

For each node (block) in the neighbor relation graph 421, the feature vector for each node is calculated by following formulas (2) to (4) by using a first attention model (node attention), so as to obtain the geographic feature for the target block:

$$e_{ij}^{\Phi} = att_{node}(h'_i, h'_j; \Phi) \tag{2}$$

$$\alpha_{ij}^{\Phi} = softmax(e_{ij}^{\Phi}) = \frac{\exp(\sigma(a_{\phi}^{T} \cdot [h'_i \mid\mid h'_j]))}{\Sigma_{k \in N_i^{\Phi}} \exp(\sigma(a_{\phi}^{T} \cdot [h'_i \mid\mid h'_k]))} \tag{3}$$

$$z_i^{\Phi} = \sigma\left(\Sigma_{j \in N_i^{\Phi}} \Omega_{ij}^{\Phi} \cdot h'_j\right) \tag{4}$$

wherein, $e_{ij}^{\Phi}$ indicates an importance of a neighbor node j (a neighbor based on an edge Φ) of the node i to the node i, which may be calculated by a neural network, a indicates an importance of the neighbor node j to node i after normalization, $\alpha_{ij}^{\Phi}$ is a parameter vector of the neural network, || indicates a vector splicing operation, $z_i^{\Phi}$ indicates a weighted sum of the neighbor feature vectors for node i by using an activation function σ, so as to obtain an aggregation representation for the node i, that is, the geographic feature of node i.

According to embodiments of the present disclosure, the geographic feature is further considered in addition to the volume feature and the volume and function relation feature of the target traffic region when predicting the volume, so as to further improve the accuracy of predicting the volume.

Figure 5:
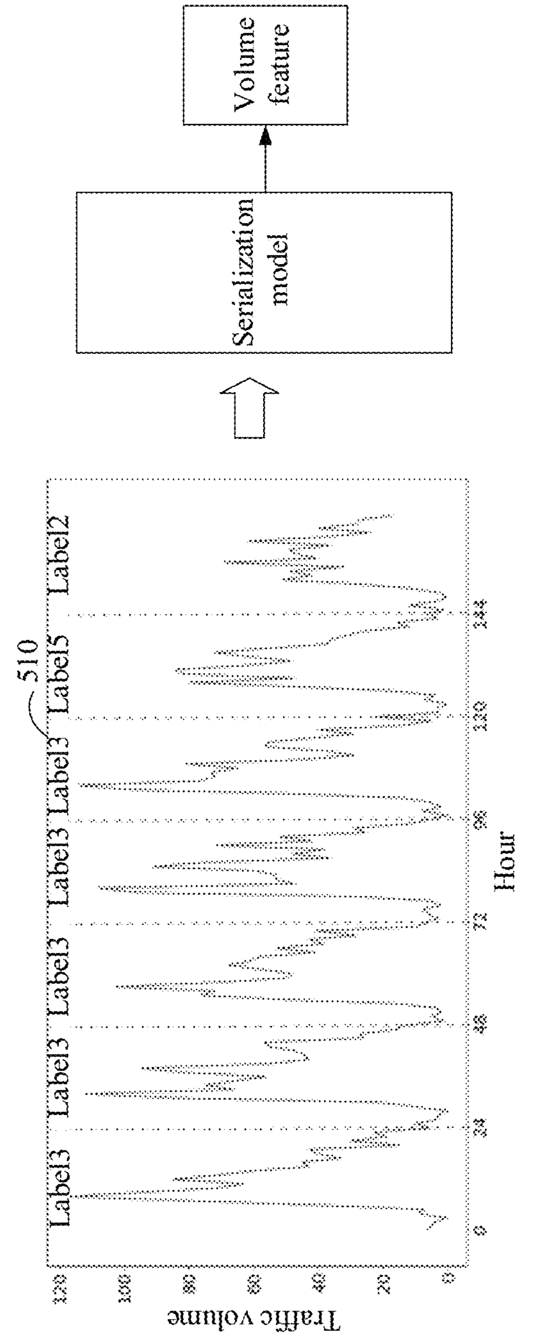
FIG. 5 shows a schematic diagram of generating a volume feature of a target traffic region according to an embodiment of the present disclosure.

FIG. 5 shows a schematic diagram of generating a volume feature of a target traffic region according to an embodiment of the present disclosure.

As shown in FIG. 5, a historical volume information 510 of the target traffic region may be a traffic volume within a historical week. The volume information sequence for the target traffic region may be obtained by serializing the historical volume information. The "Label" shown in FIG. 5 indicates a type of the volume. For example, if there are six types for the volume, Label5 indicates that the volume belongs to a fifth type, Label2 indicates that the volume belongs to a second type, and so on. A serialization model (such as gated recurrent unit, GRU) may be used to perform feature extraction and vector representation on the historical volume sequence of the target block, so as to generate the volume feature of the target block. In some embodiments, the historical volume sequence of the target block may be processed as a vector, and the historical volume sequence of the target block may be characterized based on, for example, the self-attention mechanism, so as to obtain the volume feature of the target block.

According to embodiments of the present disclosure, the volume of the target traffic region is predicted based on the volume feature and the volume and function relation feature of the target traffic region, which may improve the accuracy of predicting the volume compared with predicting the volume only according to the historical volume information.

Figure 6:
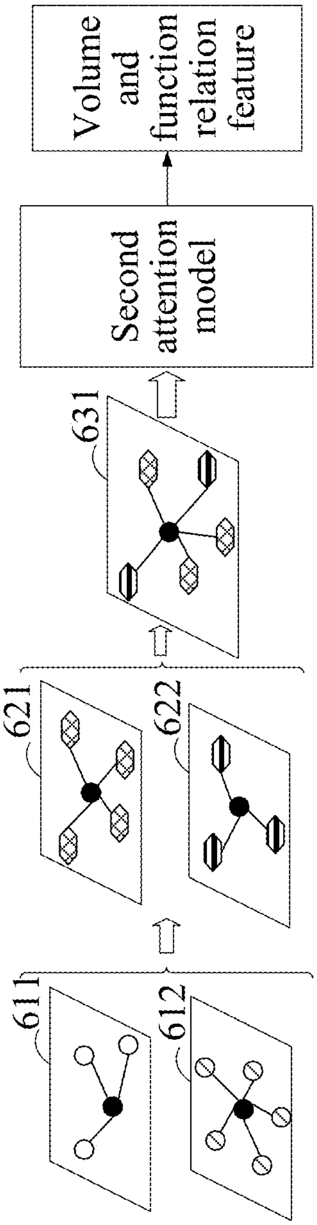
FIG. 6 shows a schematic diagram of generating a volume and function relation feature for a target traffic region according to an embodiment of the present disclosure.

FIG. 6 shows a schematic diagram of generating a volume and function relation feature for a target traffic region according to an embodiment of the present disclosure.

As shown in FIG. 6, a target block in the center of a function relation graph 611 and a target block in the center of a volume relation graph 612 may be the same block. It is possible to determine a function information and a volume information that interact with each other based on a historical function information of each node in the function relation graph 611 and a historical volume information of each node in the volume relation graph 612. Thereby, a volume information segment set 621 affecting the function transition and a function information segment set 622 affecting the traffic volume change are generated. A volume and function relation graph 631 may be generated based on the volume information segment set 621 and the function information segment set 622. A second attention model (such as node attention) is used to perform feature extraction and vector representation on the volume and function relation graph 631, so that the volume and function relation feature for the target traffic region may be obtained.

For example, a function similar neighbor block set associated with the target block is obtained from the function relation graph 611, and a volume similar neighbor block set associated with the target block is obtained from the volume relation graph 612. For the two neighbor block sets, a historical function information and a historical volume information of each block in the two neighbor block sets may be obtained. The historical function information reflects the function transition of the traffic region, and the historical volume information reflects the traffic volume change of the traffic region. The historical function information and the historical volume information are serialized to obtain a function information sequence and a volume information sequence.

A function information segment with a preset length (for example, the length is 10) is intercepted from the function information sequence. The function information sequence has various different types (such as medical treatment, education, shopping, etc.), so that the function information segment also has various different types. A volume information segment with the same preset length (for example, the length is 10) is intercepted from the volume information sequence. The volume information sequence has various different types (such as morning peak, evening peak, and flat peak), so that the volume information segment also has various different types.

Each type of function information segment is compared with each type of volume information segment in temporal order, so that at least one volume information segment that affects the function transition is selected from various types of volume information sequence segments (for example, if the volume information segment occurs before a compared function information segment, it is determined that the volume information segment affects the function transition). The selected at least one volume information sequence segment forms the volume information segment set 621. At least one function information segment that affects the traffic volume change is selected from various types of function information segments (for example, if an occurrence time instant of the function information segment is earlier than an occurrence time instant of a compared volume information segment, it is determined that the function information segment affects the traffic volume change). The selected at least one function information segment forms the function information segment set 622.

By fusing the volume information segment set 621 with the function information segment set 622, the volume and function relation graph 631 containing information segment sets that interact with each other may be generated. Feature extraction and vector representation may be performed on the volume and function relation graph 631 by using the second attention model (for example, node attention), so that the volume and function relation feature for the target traffic region may be obtained.

According to embodiments of the present disclosure, a first traffic region associated with the target region in function and a second traffic region associated with the target traffic region in volume are generated based on the function relation graph and the volume relation graph, and the volume and function relation graph is generated based on the historical function information and the historical volume information of the target traffic region, the historical function information and the historical volume information of the first traffic region and the historical function information and the historical volume information of the second traffic region, so that the generated volume and function relation feature may accurately reflect the interaction between the function transition and the traffic volume change of the traffic region.

Figure 7:
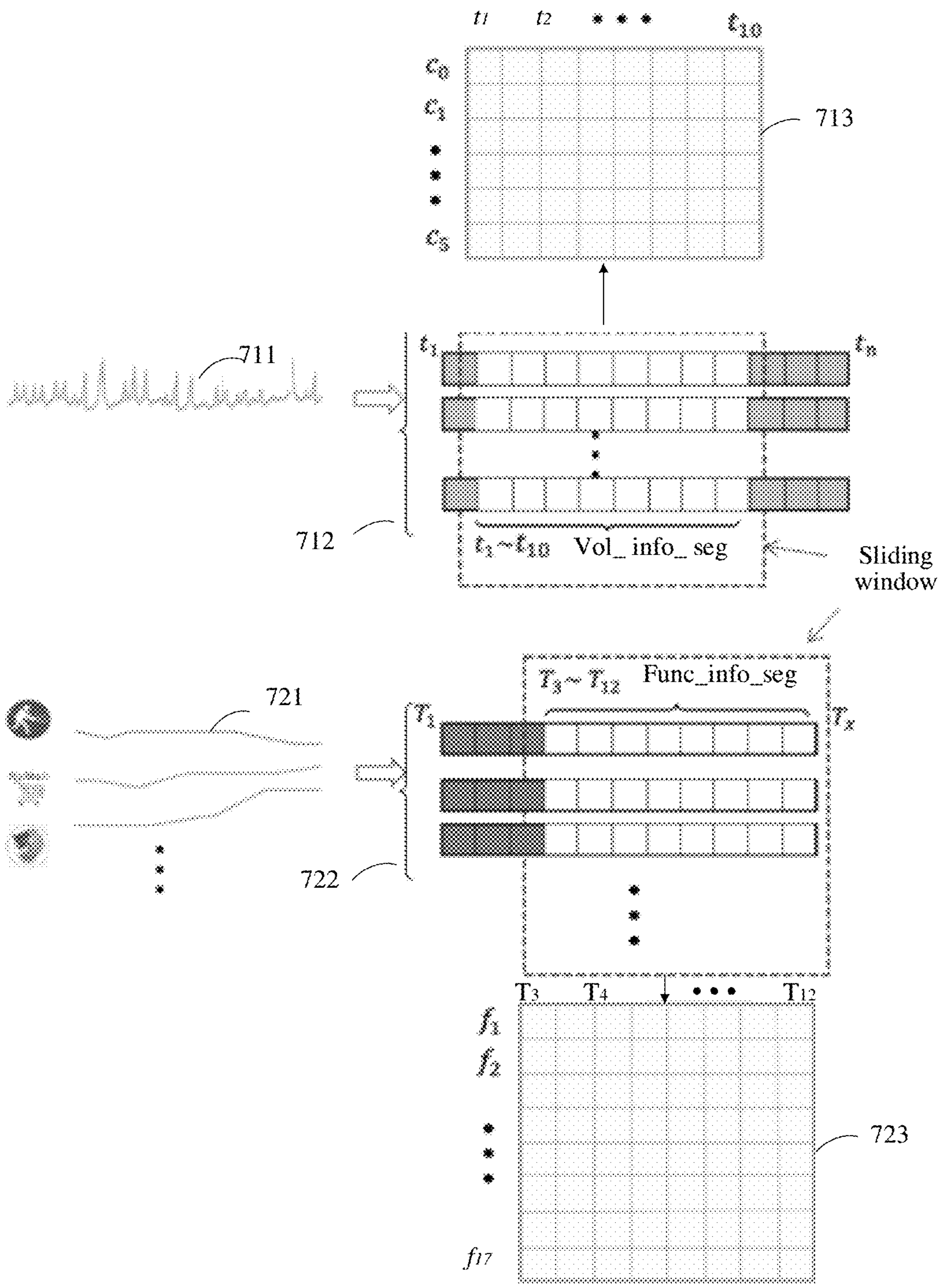
FIG. 7 shows a schematic diagram of generating a volume and function relation graph according to an embodiment of the present disclosure.

FIG. 7 shows a schematic diagram of generating a volume and function relation graph according to an embodiment of the present disclosure.

As shown in FIG. 7, a historical volume information 711 is a volume information within a historical time period $t_1$ to $t_n$ (for example, 1 to 30 days within a historical year, n=30). The historical volume information 711 is serialized to obtain a volume information sequence 712. The historical volume information may have different types such as early peak, late peak and flat peak. Therefore, the volume information sequence 712 may also have different types (for example, six types, $c_1$ to $c_5$, corresponding to the early peak, late peak and flat peak, etc.). A sliding window of a preset size (for example, with a length of ten) is used to perform sliding processing on the plurality of types of volume information sequences 712, and a plurality of volume information segments (abbreviated as Vol_info_seg) of the preset size are obtained after interception. Each volume information segment corresponds to one type, and the plurality of volume information segments form a first matrix 713.

A historical function information 721 is a function transition information within a historical time period $T_1$ to $T_X$ (for example, 1 to 12 months of a historical year, x=12). The historical function information 721 is serialized to obtain a function information sequence 722. The historical function information may have different types such as medical treatment, hospital, and shopping. Therefore, the function information sequence 722 may also have different types (for example, seventeen types, $f_1$ to $f_{17}$, corresponding to medical treatment, hospital, and shopping, etc.). A sliding window of a preset size (for example, with a length of ten) is used to perform sliding processing on the plurality of types of function information sequences 722, and a plurality of function information segments (abbreviated as Func_info_seg) of the preset size are obtained after interception. Each function information segment corresponds to one type, and the plurality of function information segments form a second matrix 723.

Each row of the first matrix 713 is compared with each row of the second matrix 723 in temporal order to determine the volume information segment affecting the function transition and the function information segment affecting the traffic volume change.

For example, a first row of the first matrix 713 is compared with each row of the second matrix 723 in temporal order. If an occurrence time instant of the first row of the first matrix 713 is earlier than that of a certain row (such as the $10^{th}$ row) of the second matrix 723, the first row of the first matrix 713 is selected as the volume information segment affecting the function information segment. Then, an information of a second row of the first matrix 713 is compared with an information of each row of the second matrix 723. If an occurrence time instant of the second row of the first matrix 713 is not earlier than that of any row of the second matrix 723, the second row of the first matrix 713 is not processed, and so on, until the last row of the first matrix 713 is compared with each row of the second matrix 723 in temporal order. Finally, the selected row(s) in the first matrix 713 are determined as the volume information segment set. Similarly, each row of the second matrix 723 is compared with each row of the first matrix 713 in temporal order, and according to a comparison result, at least one row is selected, from the second matrix 723, as the function information segment set affecting the volume information segment. The volume information segment set is combined with the function information segment set to generate the volume and function relation graph with the target block located at the center. In some embodiments, before comparing the first matrix 713 and the second matrix 723 in temporal order, some of volume information segments and function information segments that are not related to each other may be removed according to a mutual information entropy between each row of the first matrix and each row of the second matrix.

According to embodiments of the present disclosure, the plurality of function information segments and the plurality of volume information segments are generated based on the historical function information and the historical volume information for at least one of the target traffic region, the traffic region associated with the target traffic region in function, or the traffic region associated with the target traffic region in volume. The function information segment and the volume information segment are selected according to the temporal correlation between the function information segment and the volume information segment, so that the volume and function relation graph includes the volume information segment and the function information segment that interact with each other. In this way, it is possible to accurately reflect an interaction law of the function transition and the traffic volume change of the traffic region. According to embodiments of the present disclosure, the sliding processing is performed on the function information sequence and the volume information sequence respectively by using the sliding window of the preset size, the function information segment may be aligned with the volume information segment, so that the comparison between the function information segment and the volume information segment may be achieved.

Figure 8:
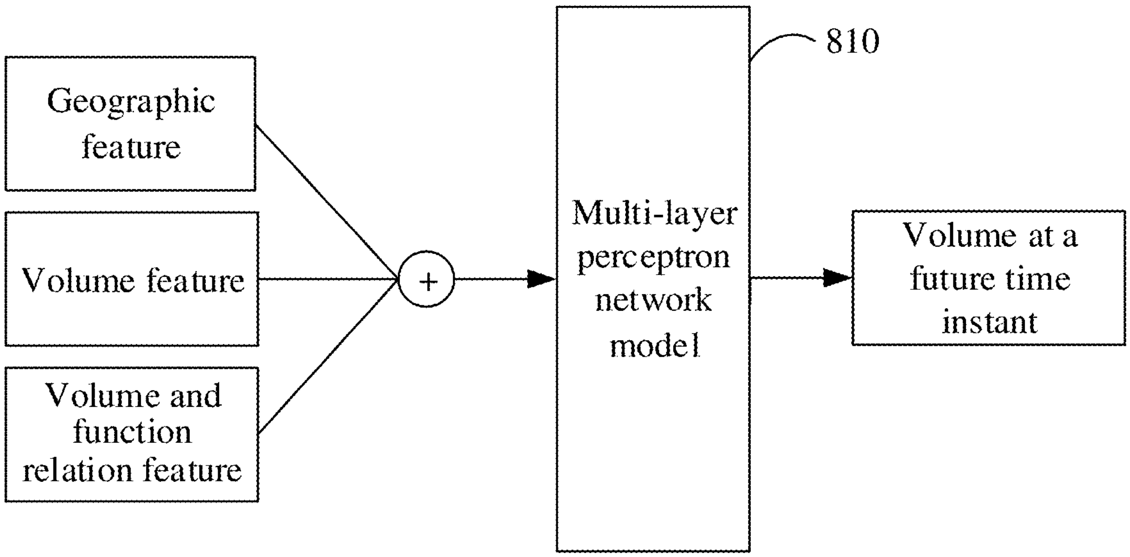
FIG. 8 shows a schematic diagram of a method of predicting a volume of a target traffic region according to an embodiment of the present disclosure.

FIG. 8 shows a schematic diagram of a method of predicting a volume of a target traffic region according to an embodiment of the present disclosure.

As shown in FIG. 8, the volume feature, the volume and function relation feature and the geographic feature are aggregated to obtain an aggregated feature. An aggregation method may include a mean pooling method, an attention pooling method and so on. A multi-layer perception network model 810 is used to predict the traffic volume based on the aggregated feature, and a traffic volume of the target traffic block at a future time instant is output.

According to embodiments of the present disclosure, the traffic volume is predicted by combining the volume feature, the volume and function relation feature and the geographic feature, so that the accuracy of predicting traffic volume may be further improved.

The traffic volume change of the traffic region interacts with the function transition of the region. For a target traffic region, an event information indicating that a volume change leads to a function change and an event information indicating that a function change leads to a volume change may be determined according to the volume and function relation feature of the target traffic region.

Figures 9, 10:
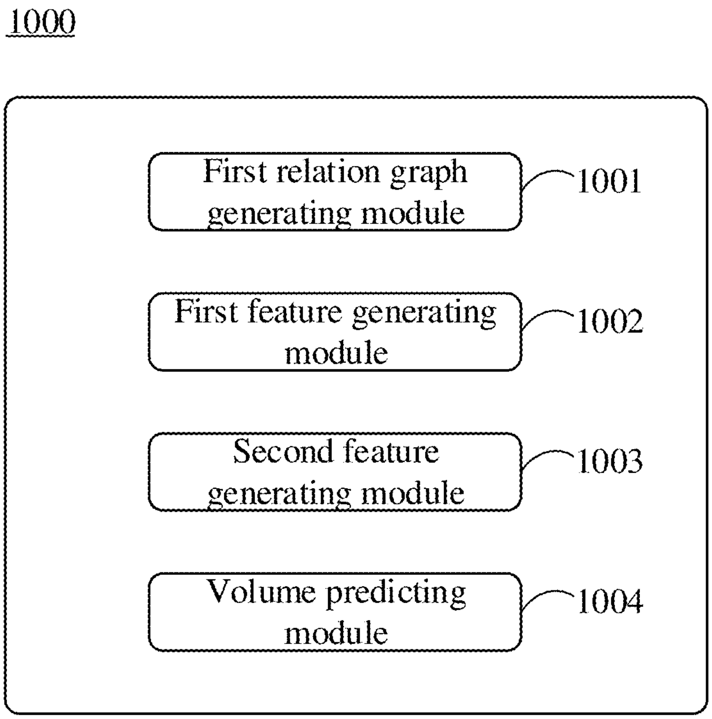
FIG. 9 shows a schematic diagram of an interaction between a traffic volume change and a region function transition according to an embodiment of the present disclosure.
FIG. 10 shows a block diagram of an apparatus of predicting traffic volume according to an embodiment of the present disclosure.

FIG. 9 shows a schematic diagram of an interaction between a traffic volume change and a region function transition according to an embodiment of the present disclosure.

As shown in FIG. 9, FIG. 9 shows an impact of a food function change and a service function change of the traffic region on the traffic volume of the region in different time periods (March 2019 to October 2019). Values in the table represent degrees of impact. The food function change of the region has a great impact on the traffic volume of the region from April 2019 to July 2019 and from June 2019 to September 2019, and the service function change of the region has a great impact on the traffic volume of the region from June 2019 to September 2019.

According to embodiments of the present disclosure, for the target traffic region, the event information indicating that a volume change leads to a function change and the event information indicating that a function change leads to a volume change is determined according to the volume and function relation feature of the target traffic region. In this way, it is possible to obtain the interaction law between the traffic volume change and the function transition of the traffic region, which is conducive to the intelligent management of urban regions.

FIG. 10 shows a block diagram of an apparatus of predicting traffic volume according to an embodiment of the present disclosure.

As shown in FIG. 10, the apparatus 1000 of predicting traffic volume may include a first relation graph generating module 1001, a first feature generating module 1002, a second feature generating module 1003, and a volume predicting module 1004.

The first relation graph generating module 1001 is used to generate, for a plurality of traffic regions, a function relation graph and a volume relation graph.

The first feature generating module 1002 is used to generate a volume feature of a target traffic region among the plurality of traffic regions, according to a historical volume information of the target traffic region.

The second feature generating module 1003 is used to generate a volume and function relation feature for the target traffic region, based on the function relation graph and the volume relation graph.

The volume predicting module 1004 is used to predict a volume of the target traffic region according to the volume feature and the volume and function relation feature.

According to embodiments of the present disclosure, the apparatus 1000 of predicting traffic volume further includes a second relation graph generating module, a third relation graph generating module, and a third feature generating module.

The second relation graph generating module is used to generate a traffic relation graph for the plurality of traffic regions.

The third relation graph generating module is used to generate a neighbor relation graph for the target traffic region among the plurality of traffic regions, based on the function relation graph, the volume relation graph, and the traffic relation graph.

The third feature generating module is used to generate a geographic feature of the target traffic region by using a first attention network model based on the neighbor relation graph.

According to embodiments of the present disclosure, the volume predicting module 1004 is used to predict the volume of the target traffic region according to the volume feature, the volume and function relation feature, and the geographic feature.

According to embodiments of the present disclosure, the volume predicting module 1004 includes a pooling processing unit and a predicting unit.

The pooling processing unit is used to pool the volume feature, the volume and function relation feature and the geographic feature, so as to obtain an aggregated feature of the target traffic region.

The predicting unit is used to predict the volume of the target traffic region based on the aggregated feature of the target traffic region by using a multi-layer perceptron network model.

According to embodiments of the present disclosure, the second feature generating module 1003 includes a first determining unit, a second determining unit, a relation graph generating unit, and a feature generating unit.

The first determining unit is used to determine, from the plurality of traffic regions, a first traffic region associated with the target traffic region in function, based on the function relation graph.

The second determining unit is used to determine, from the plurality of traffic regions, a second traffic region associated with the target traffic region in volume, based on the volume relation graph.

The relation graph generating unit is used to generate a volume and function relation graph for the target traffic region, based on a historical function information and a historical volume information of the target traffic region, a historical function information and a historical volume information of the first traffic region, and a historical function information and a historical volume information of the second traffic region.

The feature generating unit is used to generate the volume and function relation feature for the target traffic region by using a second attention network model based on the volume and function relation graph.

According to embodiments of the present disclosure, the relation graph generating unit includes a first generating sub-unit and a second generating sub-unit.

The first generating sub-unit is used to: for at least one traffic region of the target traffic region, the first traffic region, or the second traffic region, generate a plurality of function information segments based on the historical function information of the at least one traffic region, and a plurality of volume information segments based on the historical volume information of the at least one traffic region, and select at least one function information segment from the plurality of function information segments and at least one volume information segment from the plurality of volume information segments, according to a temporal correlation between each of the function information segments and each of the volume information segments.

The second generating sub-unit is used to generate the volume and function relation graph for the target traffic region, based on the target traffic region, the one or more selected function information segment, and the one or more selected volume information segment.

According to embodiments of the present disclosure, the first generating sub-unit is used to generate a function information sequence based on the historical function information, and perform sliding processing on the function information sequence by using a sliding window of a preset size, so as to obtain the plurality of function information segments; and generate a volume information sequence based on the historical volume information, and perform sliding processing on the volume information sequence by using the sliding window of the preset size, so as to obtain the plurality of volume information segments.

According to embodiments of the present disclosure, the first feature generating module 1002 is used to generate the volume feature of the target traffic region by using a serialization network model, according to the historical volume information of the target traffic region among the plurality of traffic regions.

According to embodiments of the present disclosure, the apparatus 1000 of predicting traffic volume further includes a traffic region determining module.

The traffic region determining module is used to determine the plurality of traffic regions based on a road network information, wherein each of the plurality of traffic regions corresponds to a block contained in the road network information.

According to embodiments of the present disclosure, the apparatus 1000 of predicting traffic volume further includes an event information determining module.

The event information determining module is used to determine an event information indicating that a volume change leads to a function change and an event information indicating that a function change leads to a volume change, according to the volume and function relation feature of the target traffic region.

It should be noted that, in the technical solution of the present disclosure, the collection, storage, use, processing, transmission, provision, disclosure and application of the user's personal information involved are all in compliance with the provisions of relevant laws and regulations, and necessary confidentiality measures have been taken, and it does not violate public order and good morals. In the technical solution of the present disclosure, before obtaining or collecting the user's personal information, the user's authorization or consent is obtained.

According to embodiments of the present disclosure, the present disclosure further provides an electronic device, a readable storage medium, and a computer program product.

Figure 11:
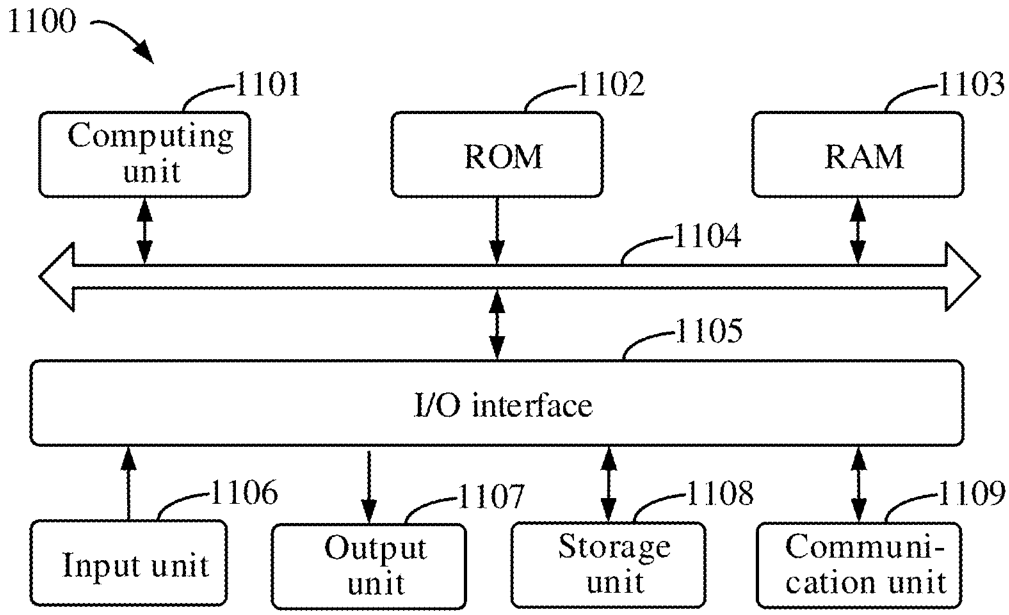
FIG. 11 shows a block diagram of an electronic device of a method of predicting traffic volume according to an embodiment of the present disclosure.

FIG. 11 shows a schematic block diagram of an exemplary electronic device 1100 that may be used to implement embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 11, the electronic device 1100 may include a computing unit 1101, which may perform various appropriate actions and processing based on a computer program stored in a read-only memory (ROM) 1102 or a computer program loaded from a storage unit 1108 into a random access memory (RAM) 1103. Various programs and data required for the operation of the electronic device 1100 may be stored in the RAM 1103. The computing unit 1101, the ROM 1102 and the RAM 1103 are connected to each other through a bus 1104. An input/output (I/O) interface 1105 is further connected to the bus 1104.

Various components in the electronic device 1100, including an input unit 1106 such as a keyboard, a mouse, etc., an output unit 1107 such as various types of displays, speakers, etc., a storage unit 1108 such as a magnetic disk, an optical disk, etc., and a communication unit 1109 such as a network card, a modem, a wireless communication transceiver, etc., are connected to the I/O interface 1105. The communication unit 1109 allows the electronic device 1100 to exchange information/data with other devices through a computer network such as the Internet and/or various telecommunication networks.

The computing unit 1101 may be various general-purpose and/or special-purpose processing components with processing and computing capabilities. Some examples of the computing unit 1101 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 1101 may perform the various methods and processes described above, such as the method of predicting traffic volume. For example, in some embodiments, the method of predicting traffic volume may be implemented as a computer software program that is tangibly contained on a machine-readable medium, such as the storage unit 1108. In some embodiments, part or all of a computer program may be loaded and/or installed on the electronic device 1100 via the ROM 1102 and/or the communication unit 1109. When the computer program is loaded into the RAM 1103 and executed by the computing unit 1101, one or more steps of the method of predicting traffic volume described above may be performed. Alternatively, in other embodiments, the computing unit 1101 may be configured to perform the method of predicting traffic volume in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, or may be a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A computer-implemented method of predicting traffic volume, the method comprising:
- generating, for a plurality of traffic regions, a function relation graph and a volume relation graph;
- generating a volume feature of a target traffic region among the plurality of traffic regions, according to a historical volume information of the target traffic region;
- generating a volume and function relation feature for the target traffic region, based on the function relation graph and the volume relation graph;
- generating a traffic relation graph for the plurality of traffic regions;
- generating a neighbor relation graph for the target traffic region among the plurality of traffic regions, based on the function relation graph, the volume relation graph and the traffic relation graph, wherein the generating the neighbor relation graph comprises:
  - acquiring a predetermined number of neighbor traffic regions adjacent to the target traffic region from the function relation graph, a predetermined number of neighbor traffic regions adjacent to the target traffic region from the volume relation graph, and a predetermined number of neighbor traffic regions adjacent to the target traffic region from the traffic relation graph, and
  - mapping feature vectors for the target traffic region and the predetermined number of neighbor traffic regions from the function relation graph, the predetermined number of neighbor traffic regions from the volume relation graph, and the predetermined number of neighbor traffic regions from the traffic relation graph to the neighbor relation graph based on a linear mapping method;
- generating a geographic feature of the target traffic region by using a first attention network model based on the neighbor relation graph; and
- predicting a volume of the target traffic region according to the volume feature, the volume and function relation feature and the geographic feature.

2. The method according to claim 1, wherein the predicting a volume of the target traffic region comprises:
- pooling the volume feature, the volume and function relation feature and the geographic feature, so as to obtain an aggregated feature of the target traffic region; and
- predicting the volume of the target traffic region based on the aggregated feature of the target traffic region by using a multi-layer perceptron network model.

3. The method according to claim 2, wherein the generating a volume and function relation feature for the target traffic region comprises:
- determining, from the plurality of traffic regions, a first traffic region associated with the target traffic region in function, based on the function relation graph;

determining, from the plurality of traffic regions, a second traffic region associated with the target traffic region in volume, based on the volume relation graph;

generating a volume and function relation graph for the target traffic region, based on a historical function information and a historical volume information of the target traffic region, a historical function information and a historical volume information of the first traffic region and a historical function information and a historical volume information of the second traffic region; and generating the volume and function relation feature for the target traffic region by using a second attention network model based on the volume and function relation graph.

4. The method according to claim 1, wherein the generating a volume and function relation feature for the target traffic region comprises:

determining, from the plurality of traffic regions, a first traffic region associated with the target traffic region in function, based on the function relation graph;

determining, from the plurality of traffic regions, a second traffic region associated with the target traffic region in volume, based on the volume relation graph;

generating a volume and function relation graph for the target traffic region, based on a historical function information and a historical volume information of the target traffic region, a historical function information and a historical volume information of the first traffic region and a historical function information and a historical volume information of the second traffic region; and generating the volume and function relation feature for the target traffic region by using a second attention network model based on the volume and function relation graph.

5. The method according to claim 4, wherein the generating a volume and function relation graph for the target traffic region comprises:

for at least one traffic region of the target traffic region, the first traffic region or the second traffic region, generating a plurality of function information segments based on the historical function information of the at least one traffic region, and a plurality of volume information segments based on the historical volume information of the at least one traffic region, and selecting at least one function information segment from the plurality of function information segments and at least one volume information segment from the plurality of volume information segments, according to a temporal correlation between each of the function information segments and each of the volume information segments; and generating the volume and function relation graph for the target traffic region, based on the target traffic region, the at least one selected function information segment and the at least one selected volume information segment.

6. The method according to claim 5, wherein:

generating the plurality of function information segments comprises generating a function information sequence based on the historical function information, and performing sliding processing on the function information sequence by using a sliding window of a preset size, so as to obtain the plurality of function information segments; and generating the plurality of volume information segments comprises generating a volume information sequence based on the historical volume information, and performing sliding processing on the volume information sequence by using the sliding window of the preset size, so as to obtain the plurality of volume information segments.

7. The method according to claim 1, wherein the generating a volume feature of a target traffic region comprises generating the volume feature of the target traffic region by using a serialization network model, according to the historical volume information of the target traffic region among the plurality of traffic regions.

8. The method according to claim 1, further comprising determining the plurality of traffic regions based on a road network information, wherein each of the plurality of traffic regions corresponds to a block contained in the road network information.

9. The method according to claim 1, further comprising, for the target traffic region, determining an event information indicating that a volume change leads to a function change and an event information indicating that a function change leads to a volume change, according to the volume and function relation feature.

10. An electronic device, comprising:

at least one processor; and a memory communicatively connected to the at least one processor, wherein the memory stores instructions executable by the at least one processor, and the instructions, when executed by the at least one processor, cause the at least one processor to at least:

generate, for a plurality of traffic regions, a function relation graph and a volume relation graph;

generate a volume feature of a target traffic region among the plurality of traffic regions, according to a historical volume information of the target traffic region;

generate a volume and function relation feature for the target traffic region, based on the function relation graph and the volume relation graph;

generate a traffic relation graph for the plurality of traffic regions;

generate a neighbor relation graph for the target traffic region among the plurality of traffic regions, based on the function relation graph, the volume relation graph and the traffic relation graph, wherein the generation of the neighbor relation graph comprises:

acquisition of a predetermined number of neighbor traffic regions adjacent to the target traffic region from the function relation graph, a predetermined number of neighbor traffic regions adjacent to the target traffic region from the volume relation graph, and a predetermined number of neighbor traffic regions adjacent to the target traffic region from the traffic relation graph, and mapping of feature vectors for the target traffic region and the predetermined number of neighbor traffic regions from the function relation graph, the predetermined number of neighbor traffic regions from the volume relation graph, and the predetermined number of neighbor traffic regions from the traffic relation graph to the neighbor relation graph based on a linear mapping method;

generate a geographic feature of the target traffic region by using a first attention network model based on the neighbor relation graph; and predict a volume of the target traffic region according to the volume feature, the volume and function relation feature and the geographic feature.

11. A non-transitory computer-readable storage medium having computer instructions therein, the computer instructions, when executed by a computer system, configured to cause the computer system to at least:

generate, for a plurality of traffic regions, a function relation graph and a volume relation graph;

generate a volume feature of a target traffic region among the plurality of traffic regions, according to a historical volume information of the target traffic region;

generate a volume and function relation feature for the target traffic region, based on the function relation graph and the volume relation graph;

generate a traffic relation graph for the plurality of traffic regions;

generate a neighbor relation graph for the target traffic region among the plurality of traffic regions, based on the function relation graph, the volume relation graph and the traffic relation graph, wherein the generation of the neighbor relation graph comprises:

acquisition of a predetermined number of neighbor traffic regions adjacent to the target traffic region from the function relation graph, a predetermined number of neighbor traffic regions adjacent to the target traffic region from the volume relation graph, and a predetermined number of neighbor traffic regions adjacent to the target traffic region from the traffic relation graph, and mapping of feature vectors for the target traffic region and the predetermined number of neighbor traffic regions from the function relation graph, the predetermined number of neighbor traffic regions from the volume relation graph, and the predetermined number of neighbor traffic regions from the traffic relation graph to the neighbor relation graph based on a linear mapping method;

generate a geographic feature of the target traffic region by using a first attention network model based on the neighbor relation graph; and predict a volume of the target traffic region according to the volume feature, and the volume and function relation feature and the geographic feature.

12. The computer-readable storage medium of claim 11, wherein the instructions configured to cause the computer system to predict the volume of the target traffic region are further configured to cause the computer system to:

pool the volume feature, the volume and function relation feature and the geographic feature, so as to obtain an aggregated feature of the target traffic region; and predict the volume of the target traffic region based on the aggregated feature of the target traffic region by using a multi-layer perceptron network model.

13. The computer-readable storage medium of claim 11, wherein the instructions configured to cause the computer system to generate the volume and function relation feature for the target traffic region are further configured to cause the computer system to:

determine, from the plurality of traffic regions, a first traffic region associated with the target traffic region in function, based on the function relation graph;

determine, from the plurality of traffic regions, a second traffic region associated with the target traffic region in volume, based on the volume relation graph;

generate a volume and function relation graph for the target traffic region, based on a historical function information and a historical volume information of the target traffic region, a historical function information and a historical volume information of the first traffic region and a historical function information and a historical volume information of the second traffic region; and generate the volume and function relation feature for the target traffic region by using a second attention network model based on the volume and function relation graph.

14. The computer-readable storage medium of claim 13, wherein the instructions configured to cause the computer system to generate the volume and function relation feature for the target traffic region are further configured to cause the computer system to:

for at least one traffic region of the target traffic region, the first traffic region or the second traffic region, generate a plurality of function information segments based on the historical function information of the at least one traffic region, and a plurality of volume information segments based on the historical volume information of the at least one traffic region, and select at least one function information segment from the plurality of function information segments and at least one volume information segment from the plurality of volume information segments, according to a temporal correlation between each of the function information segments and each of the volume information segments; and generate the volume and function relation graph for the target traffic region, based on the target traffic region, the at least one selected function information segment and the at least one selected volume information segment.

15. The computer-readable storage medium of claim 14, wherein the instructions configured to cause the computer system to generate the plurality of function information segments are further configured to cause the computer system to generate a function information sequence based on the historical function information, and perform sliding processing on the function information sequence by using a sliding window of a preset size, so as to obtain the plurality of function information segments; and wherein the instructions configured to cause the computer system to generate the plurality of volume information segments are further configured to cause the computer system to generate a volume information sequence based on the historical volume information, and perform sliding processing on the volume information sequence by using the sliding window of the preset size, so as to obtain the plurality of volume information segments.

16. The computer-readable storage medium of claim 11, wherein the instructions configured to cause the computer system to generate the volume feature of a target traffic region are further configured to cause the computer system to generate the volume feature of the target traffic region by using a serialization network model, according to the historical volume information of the target traffic region among the plurality of traffic regions.

17. The computer-readable storage medium of claim 11, wherein the instructions are further configured to cause the computer system to determine the plurality of traffic regions based on a road network information, wherein each of the plurality of traffic regions corresponds to a block contained in the road network information.

18. The computer-readable storage medium of claim 11, wherein the instructions are further configured to cause the computer system to, for the target traffic region, determine an event information indicating that a volume change leads to a function change and an event information indicating that a function change leads to a volume change, according to the volume and function relation feature.

19. The computer-readable storage medium of claim 11, wherein the instructions configured to cause the computer system to generating the volume and function relation feature for the target traffic region are further configured to cause the computer system to:

determine, from the plurality of traffic regions, a first traffic region associated with the target traffic region in function, based on the function relation graph;

determine, from the plurality of traffic regions, a second traffic region associated with the target traffic region in volume, based on the volume relation graph;

generate a volume and function relation graph for the target traffic region, based on a historical function information and a historical volume information of the target traffic region, a historical function information and a historical volume information of the first traffic region and a historical function information and a historical volume information of the second traffic region; and generate the volume and function relation feature for the target traffic region by using a second attention network model based on the volume and function relation graph.

* * * * *